United States Patent
Homsey

(10) Patent No.: US 6,381,065 B1
(45) Date of Patent: Apr. 30, 2002

(54) OPTICAL PUMP UNIT FOR AN OPTICAL AMPLIFIER

(75) Inventor: Glen Mitchell Homsey, Red Bank, NJ (US)

(73) Assignee: TyCom (US) Inc., Morristown, NJ (US)

( * ) Notice: Subject to any disclaimer, the term of this patent is extended or adjusted under 35 U.S.C. 154(b) by 0 days.

(21) Appl. No.: 09/277,018

(22) Filed: Mar. 26, 1999

(51) Int. Cl.[7] .............................. H01S 3/10; H04J 14/02
(52) U.S. Cl. ............. 359/341.32; 359/160; 359/341.31; 372/6; 372/72
(58) Field of Search .................................. 359/134, 160, 359/341, 344, 345, 349, 341.31, 341.32; 372/6, 72

(56) References Cited

U.S. PATENT DOCUMENTS

| | | | |
|---|---|---|---|
| 5,241,414 A | | 8/1993 | Giles et al. .................. 359/341 |
| 5,375,010 A | | 12/1994 | Zervas et al. ................ 359/341 |
| 5,430,752 A | | 7/1995 | DiGiovanni et al. ........ 359/341 |
| 5,457,568 A | * | 10/1995 | Veselka et al. .............. 359/341 |
| 5,485,481 A | * | 1/1996 | Ventrudo et al. ............... 372/6 |
| 5,532,864 A | | 7/1996 | Alexander et al. .......... 359/177 |
| 5,535,051 A | | 7/1996 | Basiev et al. ................ 359/342 |
| 5,555,330 A | | 9/1996 | Pan et al. ....................... 385/39 |
| 5,563,732 A | * | 10/1996 | Erdogan et al. ............. 359/341 |
| 5,579,153 A | | 11/1996 | Laming et al. .............. 359/341 |
| 5,581,397 A | * | 12/1996 | Maki et al. ................... 359/341 |
| 5,589,684 A | * | 12/1996 | Ventrudo et al. ............ 372/102 |
| 5,642,219 A | * | 6/1997 | Ogiya et al. ................. 359/341 |
| 5,642,447 A | | 6/1997 | Pan et al. ....................... 385/31 |
| 5,642,448 A | | 6/1997 | Pan et al. ....................... 385/24 |
| 5,652,814 A | | 7/1997 | Pan et al. ....................... 385/24 |
| 5,659,559 A | | 8/1997 | Ventrudo et al. ............... 372/6 |
| 5,673,129 A | | 9/1997 | Mizrahi ........................ 359/124 |
| 5,696,615 A | | 12/1997 | Alexander .................... 359/134 |
| 5,715,263 A | * | 2/1998 | Ventrudo et al. ............... 372/6 |
| 5,721,636 A | * | 2/1998 | Erdogan et al. ............. 359/341 |
| 5,726,784 A | | 3/1998 | Alexander et al. .......... 359/125 |
| 5,742,427 A | | 4/1998 | Kakui et al. ................. 359/341 |
| 5,790,722 A | * | 8/1998 | Minden et al. .............. 359/341 |
| 5,798,855 A | | 8/1998 | Alexander et al. .......... 359/177 |
| 5,812,306 A | | 9/1998 | Mizrahi ........................ 359/341 |
| 5,841,797 A | * | 11/1998 | Ventrudo et al. ............... 372/6 |
| 5,920,423 A | * | 7/1999 | Grubb et al. ................. 359/341 |
| 6,041,072 A | * | 3/2000 | Ventrudo et al. ............ 372/102 |
| 6,058,128 A | * | 5/2000 | Ventrudo et al. .............. 372/96 |

OTHER PUBLICATIONS

Bernard et al, IEEE, Aug. 1992; pp. 911–13, vol. 8.*
Giles, C.R. et al., "Simultaneous Wavelength–Stabilization of 980–nm Pump Lasers", IEEE Photonics Letters, vol. 6, No. 8, Aug. 1994.
Ventrudo, B.F. et al, "Wavelength and Intensity Stabilisation of 980nm Diode Lasers Coupled to Fibre Bragg Gratings", Electronic Letters, Dec. 8, 1999, vol. 30, No. 25, pp. 2147–2149.

* cited by examiner

*Primary Examiner*—Nelson Moskowitz

(57) ABSTRACT

A method and apparatus is provided for pumping an active medium in an optical amplifier. The active medium substantially maximizes amplification when pumped at a pump wavelength. If the active medium is erbium, for example, a pump wavelength of 980 nm may be employed. The apparatus includes a plurality of fiber Bragg grating lasers operating in a regime of coherence collapse. Each of the lasers generate optical energy at a different wavelength, which are distributed about the pump wavelength. The apparatus also includes optical components for combining the different wavelengths to form a pump beam and a coupler for coupling the pump beam to the active medium.

7 Claims, 2 Drawing Sheets

OPTICAL PUMP UNIT FOR AN OPTICAL AMPLIFIER

FIELD OF THE INVENTION

This invention relates an optical fiber pump unit for pumping an optical amplifier, and more particularly to an optical fiber pump unit that employs fiber Bragg grating lasers operating at separate, discrete wavelengths so that the energy from any one laser does not affect the performance of the other lasers.

BACKGROUND OF THE INVENTION

Erbium-doped fiber amplifiers require high power, reliable pump lasers. Erbium-doped fiber amplifiers are typically pumped at either 1480 nm or 980 nm, while amplifying signals in the 1530–1560 nm range. Pumping at 980 nm offers numerous advantages, including a lower amplifier noise figure and higher conversion efficiency than 1480 nm lasers. However, pump lasers operating at 980 nm may experience wavelength and intensity instabilities due to external reflections coupling back into the laser cavity and by temperature and injection current fluctuations. Such instabilities adversely effect the performance of the amplifier. These problems have been substantially alleviated by the development of the fiber Bragg grating (FBG) stabilized laser. These lasers employ optical feedback from fiber Bragg gratings to improve the optical output characteristics of 980 nm pump lasers.

U.S. Pat. No. 5,563,732 discloses a fiber Bragg grating (FBG) laser that is suitable for use as a pump source for an optical amplifier. The laser disclosed therein operates in the regime referred to as coherence collapse, which results in spectral broadening of the laser output. Coherence collapse is a regime of laser operation in which satellite emission increases pump power at the expense of narrow emission. Coherence collapse is one of five regimes of laser operation permitted for a laser-grating arrangement (See R. W. Tkach and A. R. Chraplyvy, J. of Lightwave Tech., vol. LT-4, No. 11, pp. 1655–1661). Pump use benefits from the increased power while being tolerant of spectral broadening. However, coherence collapse can also lead to spectral fluctuations, which can adversely effect population inversion that occurs in the optical amplifier's active medium.

Accordingly, it would be desirable to provide a laser pump source operating in the regime of coherence collapse which does not negatively impact the process of pumping the active medium in an optical amplifier.

SUMMARY OF THE INVENTION

In accordance with the present invention, a method and apparatus is provided for pumping an active medium in an optical amplifier. The active medium substantially maximizes amplification when pumped at a pump wavelength. If the active medium is erbium, for example, a pump wavelength of 980 nm may be employed. The apparatus includes a plurality of fiber Bragg grating lasers operating in a regime of coherence collapse. Each of the lasers generate optical energy at a different wavelength, which are distributed about the pump wavelength. The apparatus also includes optical components for combining the different wavelengths to form a pump beam and a coupler for coupling the pump beam to the active medium.

By providing a distribution of pump wavelengths about the nominal pump wavelength, which is the wavelength of maximum pumping efficiency, optical energy from one pump laser will have a relatively small adverse effect on the other pump lasers. The different wavelengths may be advantageously selected to increase the spread in the pump spectra without causing a decrease in pumping efficiency beyond a prescribed amount (e.g., 0.1 dB).

DETAILED DESCRIPTION

Figure 1:
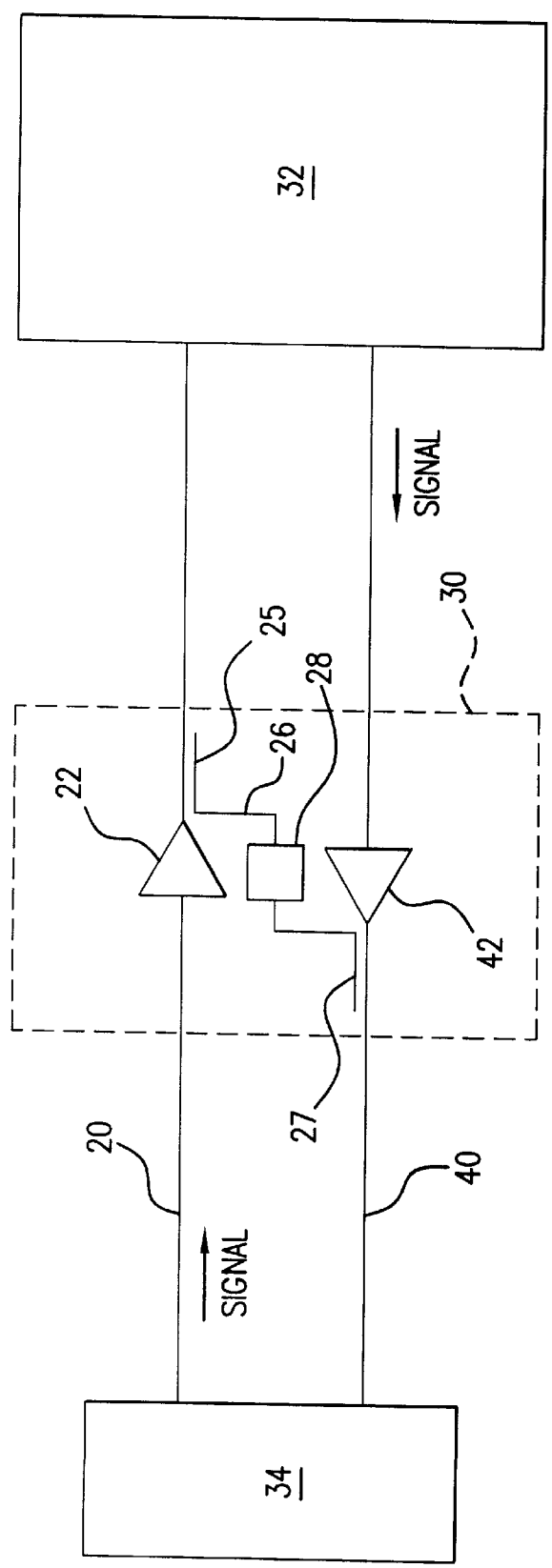
FIG. 1 shows a lightwave communication system that includes at least one optical repeater constructed in accordance with the present invention.

Referring to FIG. 1, there is disclosed a lightwave communication system which utilizes optical fiber amplifiers. The system includes transmitter/receiver terminals 32 and 34 and optical transmission fiber paths 20 and 40 supporting bi-directional communication. A plurality of optical amplifiers 22 and 42 are interposed in the fiber paths 20 and 40 between the transmitter/receiver terminals 34 and 32. Optical amplifiers 22 and 42 contain a length of doped fiber that provides a gain medium, an energy source that pumps the fiber to provide gain, and a means of coupling the pump energy into the doped fiber without interfering with the signal being amplified. These components of the optical amplifiers are shown in greater detail in FIG. 2.

Figure 2:
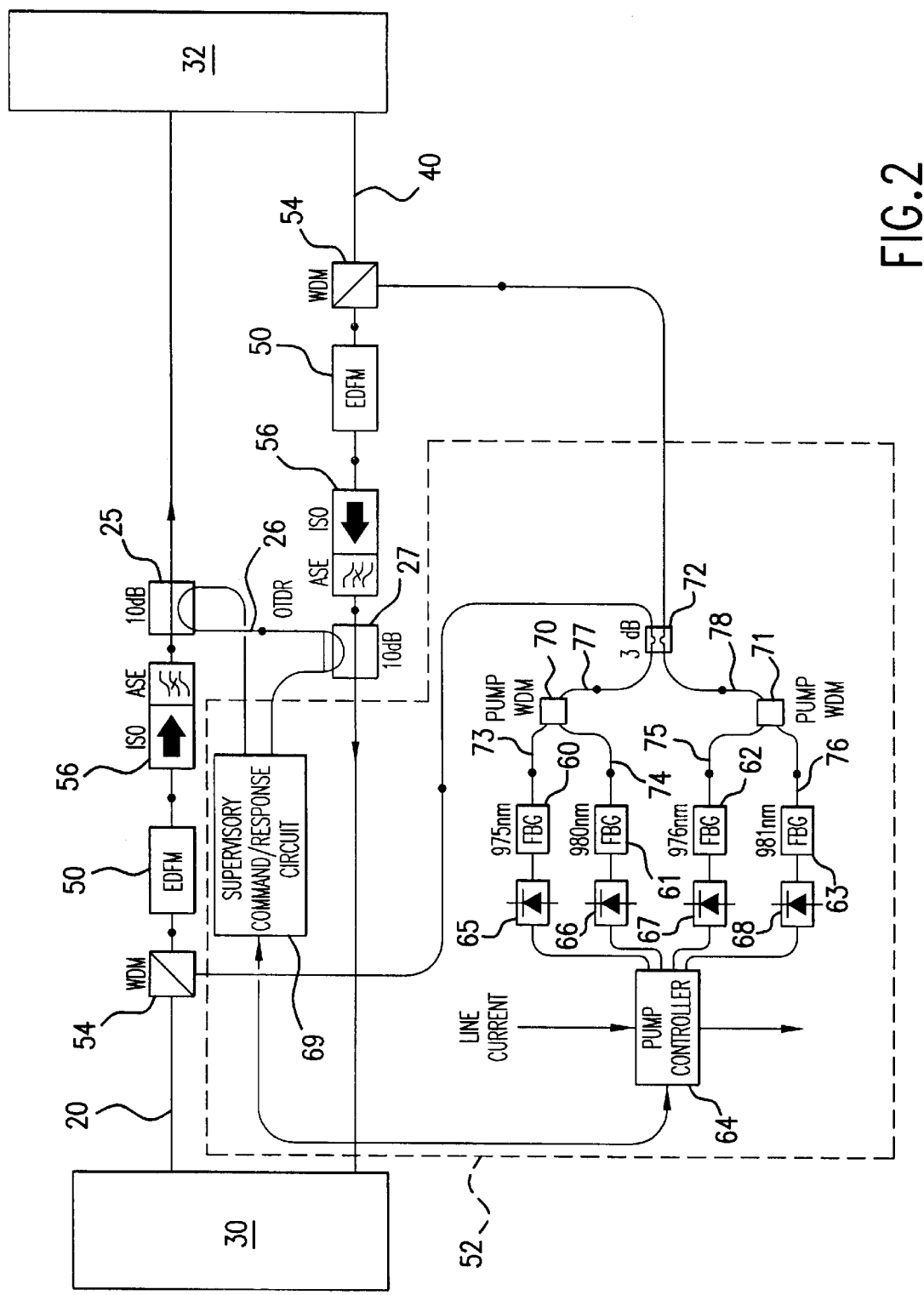
FIG. 2 shows details of the optical repeater shown in FIG. 1

Referring to FIG. 2, each optical amplifier includes a doped optical fiber 50 coupled to a source of optical pump energy via a coupler 54 such as a wavelength division multiplexer (WDM). In undersea communication systems a pair of such optical amplifiers supporting opposite-traveling signals is housed in a single unit 30 known as a repeater. The signals being transmitted from the terminals 30 and 32 are in optical form. There is no intermediate conversion to electrical form. While only one repeater is depicted in FIG. 1 for clarity of discussion, it should be understood by those skilled in the art that the present invention finds application in transmission paths of all lengths having many additional sets of such repeaters.

An optical isolator 56 is typically located immediately downstream from each of the optical amplifiers. The isolators prevent amplified spontaneous emission from traveling back upstream and disrupting system stability by causing the amplifiers to oscillate.

Each repeater includes a loop-back path 26 through which a portion of the signal reflected by Rayleigh scattering may be tapped and returned along the opposite-traveling fiber path so that OTDR may be performed. As shown in FIGS. 1 and 2, directional couplers 25 and 27 are located at the outputs of (i.e., downstream from) optical amplifiers 22 and 42, respectively. That is, the backscattered signal is coupled to the opposite-going fiber so that it does not undergo amplification in the optical amplifiers. The couplers 25 and 27, which are typically 10 dB couplers, are connected by optical path 26. In operation, a portion of the backscattered signal traveling along optical fiber 20 is coupled to optical path 40 via loop-back path 26 and returned to terminal 30 where OTDR may be performed. Similarly, a portion of the backscattered signal traveling along optical fiber 40 is coupled to optical path 20 via loop-backpath 26 and returned to terminal 32.

Pump unit 52 provides the optical pump energy for both transmission directions of the amplifier pair. The pump unit 52 includes fiber Bragg grating (FBG) stabilized pump lasers 60–63, pump controller 64 and supervisory/command response (SCR) circuit 65. The pump controller 64 comprises a comparator and feedback circuit for powering and controlling the pump lasers 60–63. The SCR circuit 65 receives a portion of the optical signal tapped by couplers 25 and 27. The SCR circuit 65 receives commands from the terminal and transmits a response back thereto. The pump controller 64, responsive to signals from the SCR circuit 65 and photodetectors 65–68, maintains the optical signal power level at a constant value by adjusting the pump laser bias current to maintain the back photodetector current at a constant value.

The power from pump lasers 50–63 may be combined and supplied to the couplers 54 by any convenient means. For example, as detailed below, in one embodiment of the invention wavelength division multiplexing combiners are employed and in another embodiment polarization beam splitters are employed. In a preferred embodiment of the invention the combining means incorporates wavelength division multiplexing combiners because this arrangement requires less expensive components.

As mentioned, in one embodiment of the invention the power output from pump lasers 60 and 61 are directed to polarization beam splitter 70 via polarization maintaining fibers 73 and 74. Similarly, the power output from pump lasers 62 and 63 are directed to polarization beam splitter 71 via polarization maintaining fibers 75 and 76. A polarization beam splitter is an optical device which accepts light in different polarization states at its input ports and combines them so that a single unpolarized light beam appears at its output port. Polarization beam splitters 70 and 71 thus each receive two polarized input beams and output a single pump beam that is in an unpolarized state. The unpolarized pump beam provided by each polarization beam splitter 70 and 71 is directed onto single mode fibers 77 and 78, respectively. The unpolarized pump beams are directed to the inputs of a 3 dB coupler 72 so that half of the total pump power is directed to each WDM 54 on transmission paths 20 and 40 to pump the doped fibers 50 disposed therein.

Laser pumps 60–63 generate optical pump beams at a suitable wavelength for producing amplification in doped optical fibers 50. For erbium doped fibers, pump wavelengths in the neighborhood of 980 nm are suitable. Prior art pump units, such as disclosed in U.S. Pat. No. 5,241,414, have employed a plurality of laser pumps for the purpose of achieving high reliability through redundancy. Typically, in such systems the laser pumps all operate at the same wavelength, such as 980 nm, for example.

In accordance with the present invention, to overcome the adverse effects of coherence collapse, the laser pumps 60–63 provide a distribution of pump wavelengths about the nominal value of 980 nm, which is the wavelength of maximum pumping efficiency. As a result, optical energy from one pump laser will have a relatively small adverse effect on the other pump lasers. Thus, in the illustrative embodiment of the invention shown in FIG. 2, the pump lasers 60–63 operate at wavelengths of 975 nm, 979 nm, 977 nm, and 981 nm, respectively. These wavelengths are approximately centered about the optimal pumping wavelength of 980 nm. Unfortunately, by spreading the wavelengths in this manner the efficiency with which the erbium doped fiber is pumped is reduced. In general, it has been determined that it is advantageous if the wavelengths are chosen to spread the pump spectra as wide as possible without causing the pump efficiency to fall off by more than 0.1 dB.

In an alternative embodiment of the invention, the 3 db coupler 72 may be placed upstream from the polarization beam splitters 70 and 71. That is, the 3 db coupler 72 may be located between the pump lasers 60–63 and the polarization beam splitters 70 and 71. In this arrangement, however, the coupler 72 must employ polarization maintaining fiber, which substantially increases the cost of the component. In contrast, the arrangement shown in FIG. 2 only requires a less expensive 3 dB coupler 72 formed from single mode fiber since the output beam from polarization beam splitters 70 and 71 is unpolarized. Moreover, the arrangement shown in FIG. 2 offers a performance advantage because it reduces optical loss due to splices.

As previously mentioned, in yet another alternative embodiment of the invention, the polarization beam splitters 70 and 71 are replaced with wavelength division multiplexers. In this case the pump beams are combined based on their different wavelengths rather than their different polarization states. An important advantage of this embodiment is that since polarization maintaining fibers 73–76 may be replaced with single mode fibers, the pump lasers 60–63 do not require a polarization maintaining fiber pigtail, thus allowing the use of a considerably less expensive laser unit.

What is claimed is:

1. A pump unit for pumping active media in a pair of optical amplifiers in a bidirectional lightwave communication system, said pump unit comprising:
   a) a 3 dB coupler having first and second input ports for coupling optical energy, and first and second output ports for supplying pump beams at approximately half of said coupled optical energy to each of said optical amplifiers;
   b) a first pump source comprising a plurality of fiber Bragg grating lasers operating in a regime of coherence collapse for supplying optical energy P1 to said first input port of said 3 dB coupler; and
   c) a second pump source comprising a plurality of fiber Bragg grating lasers operating in a regime of coherence collapse for supplying optical energy P2 to said second input port of said 3 dB coupler;
   d) wherein said optical energy P1 is distinct from said optical energy P2 in that P1 and P2 have distinct pump wavelengths or distinct polarization states or both distinct pump wavelengths and polarization states.

2. The pump unit of claim 1 wherein each of said plurality of lasers of said first pump source and said second pump source generate optical energy at different wavelengths, said different wavelengths having values distributed about a predetermined pump wavelength.

3. The pump unit of claim 1 wherein said plurality of lasers of said first pump source generate optical energy at a different polarization state from said plurality of lasers of said second pump source.

4. The pump unit of claim 1 further comprising means for adjusting a power level of said pump beams so that said optical amplifiers generate an optical signal at a substantially constant power level.

5. The pump unit of claim 1 further comprising:
   a) a plurality of single mode fibers respectively receiving said different wavelengths generated by said lasers; and
   b) at least one wavelength division multiplexer coupled to said plurality of single mode fibers for multiplexing said different wavelengths.

6. The pump unit of claim 1 wherein said lasers operate at a wavelength of approximately 980 nm.

7. A method for pumping active media in a pair of optical amplifiers in a bidirectional lightwave communication system, said method comprising:

a) providing a 3 dB coupler having first and second input ports;

b) providing a first pump source for supplying optical energy P1 to said first input port of said coupler;

c) providing a second pump source for supplying optical energy P2 to said second input port of said coupler;

d) generating optical energy P1 at said first pump source from a plurality of fiber Bragg grating lasers operating in a regime of coherence collapse, each having a different wavelength;

e) generating optical energy P2 at said second pump source from a plurality of fiber Bragg grating lasers operating in a regime of coherence collapse, each having a different wavelength;

f) coupling said different wavelengths of said first pump source and said second pump source to form a pump beam; and g) distributing said pump beam to said pair of optical amplifiers.

* * * * *